US008279596B2

(12) United States Patent
Rodriguez et al.

(10) Patent No.: US 8,279,596 B2
(45) Date of Patent: Oct. 2, 2012

(54) FAN MOUNTING SYSTEM

(75) Inventors: Alejandro Z. Rodriguez, Round Rock, TX (US); Brian T. Whitman, University Place, WA (US); Char Damneun, Olympia, WA (US); Corey D. Hartman, Hutto, TX (US); Glen P. Gordon, Graham, WA (US); Jeffory L. Smalley, Olympia, WA (US)

(73) Assignee: Dell Products L.P., Round Rock, TX (US)

( * ) Notice: Subject to any disclaimer, the term of this patent is extended or adjusted under 35 U.S.C. 154(b) by 218 days.

(21) Appl. No.: 12/846,286

(22) Filed: Jul. 29, 2010

(65) Prior Publication Data
US 2012/0026678 A1  Feb. 2, 2012

(51) Int. Cl.
*G06F 1/20* (2006.01)
*H05K 7/20* (2006.01)

(52) U.S. Cl. ......... 361/679.48; 361/679.02; 361/679.31; 361/679.6; 361/695; 312/223.2; 312/236; 415/213.1

(58) Field of Classification Search ............. 361/679.02, 361/679.31–679.32, 679.48, 694–695; 312/223.2, 312/236; 415/213.1
See application file for complete search history.

(56) References Cited

U.S. PATENT DOCUMENTS

| | | | |
|---|---|---|---|
| 6,603,661 B2 * | 8/2003 | Smith et al. | 361/695 |
| 6,714,411 B2 | 3/2004 | Thompson et al. | |
| 6,839,233 B2 | 1/2005 | Cravens et al. | |
| 7,170,744 B2 * | 1/2007 | Li | 361/679.48 |
| 7,236,361 B2 * | 6/2007 | Cote et al. | 361/695 |
| 7,304,843 B2 * | 12/2007 | Peng et al. | 361/679.48 |
| 7,481,704 B2 * | 1/2009 | Kao et al. | 454/184 |
| 7,580,260 B2 | 8/2009 | Figuerado | |
| 2009/0195979 A1 * | 8/2009 | Ji et al. | 361/679.48 |

* cited by examiner

*Primary Examiner* — Robert J Hoffberg
(74) *Attorney, Agent, or Firm* — Haynes and Boone, LLP

(57) ABSTRACT

A fan mounting system includes a fan chassis defining a plurality of fan housings. A guide member is located on the fan chassis. At least one board support member extends from the fan chassis and is operable to extend through a board to engage an Information Handling System (IHS) chassis when the fan chassis is positioned in the IHS chassis. An IHS chassis cover anchor is located on the fan chassis and is operable to engage an IHS chassis cover and secure the IHS chassis cover to the IHS chassis when the fan chassis is coupled to the IHS chassis.

20 Claims, 18 Drawing Sheets

FAN MOUNTING SYSTEM

BACKGROUND

The present disclosure relates generally to information handling systems, and more particularly to a fan mounting system for an information handling system chassis.

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs such as, for example, servers, may include one or more fan mounting systems that house a plurality of fans and are operable to mount those fans to the server chassis. As IHSs become more powerful, IHS component density in the IHS chassis housing increases and volume within the IHS chassis becomes more valuable. Conventional fan mounting systems add another component to the IHS chassis housing and use up this valuable volume within the IHS chassis.

Accordingly, it would be desirable to provide an improved fan mounting system that provides for a more efficient use of the volume within the IHS chassis.

SUMMARY

According to one embodiment, a fan mounting system includes a fan chassis defining a plurality of fan housings, a guide member located on the fan chassis, at least one board support member extending from the fan chassis, wherein the board support member is operable to extend through a board to engage an IHS chassis when the fan chassis is positioned in the IHS chassis, and an IHS chassis cover anchor located on the fan chassis, wherein the IHS chassis cover anchor is operable to engage an IHS chassis cover and secure the IHS chassis cover to the IHS chassis when the fan chassis is coupled to the IHS chassis.

BRIEF DESCRIPTION OF THE DRAWINGS

FIG. 2b is a rear perspective view illustrating an embodiment of the fan of FIG. 2a.

FIG. 3b is a rear perspective view illustrating an embodiment of the fan chassis of FIG. 3a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
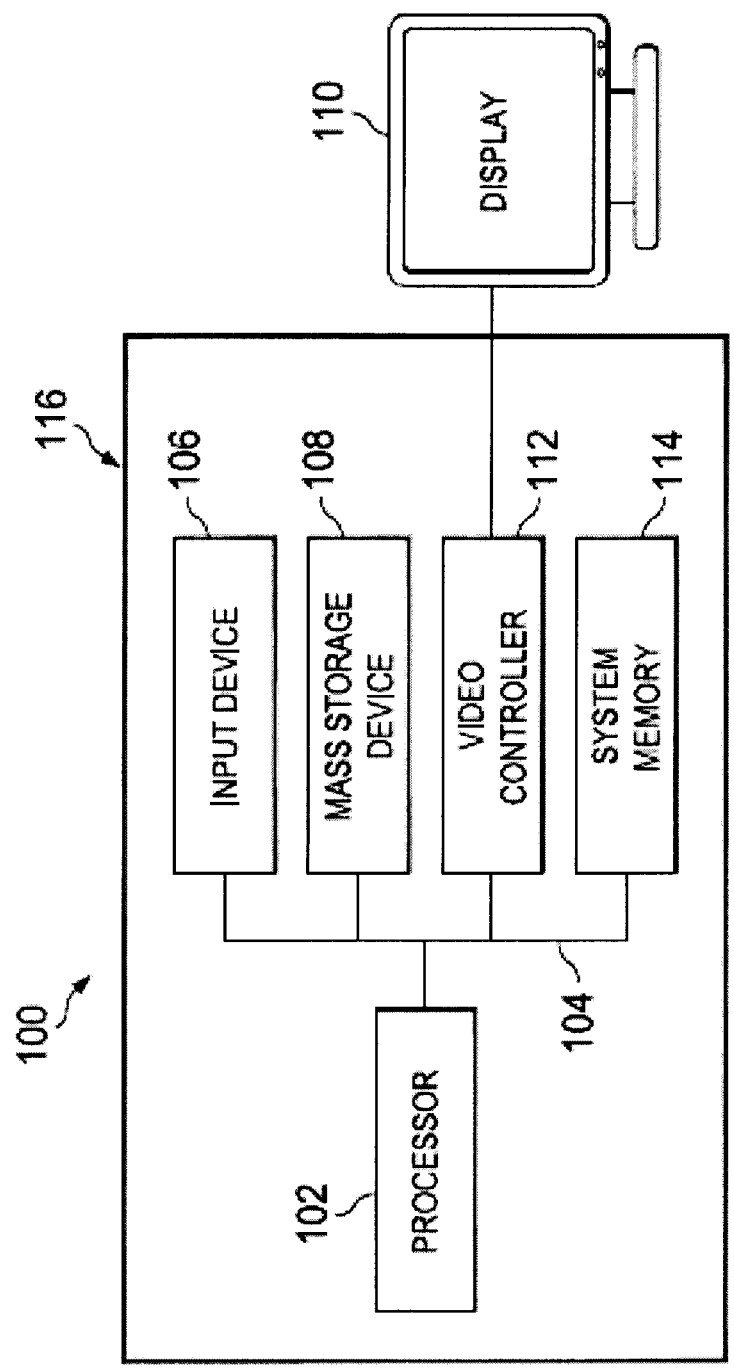
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
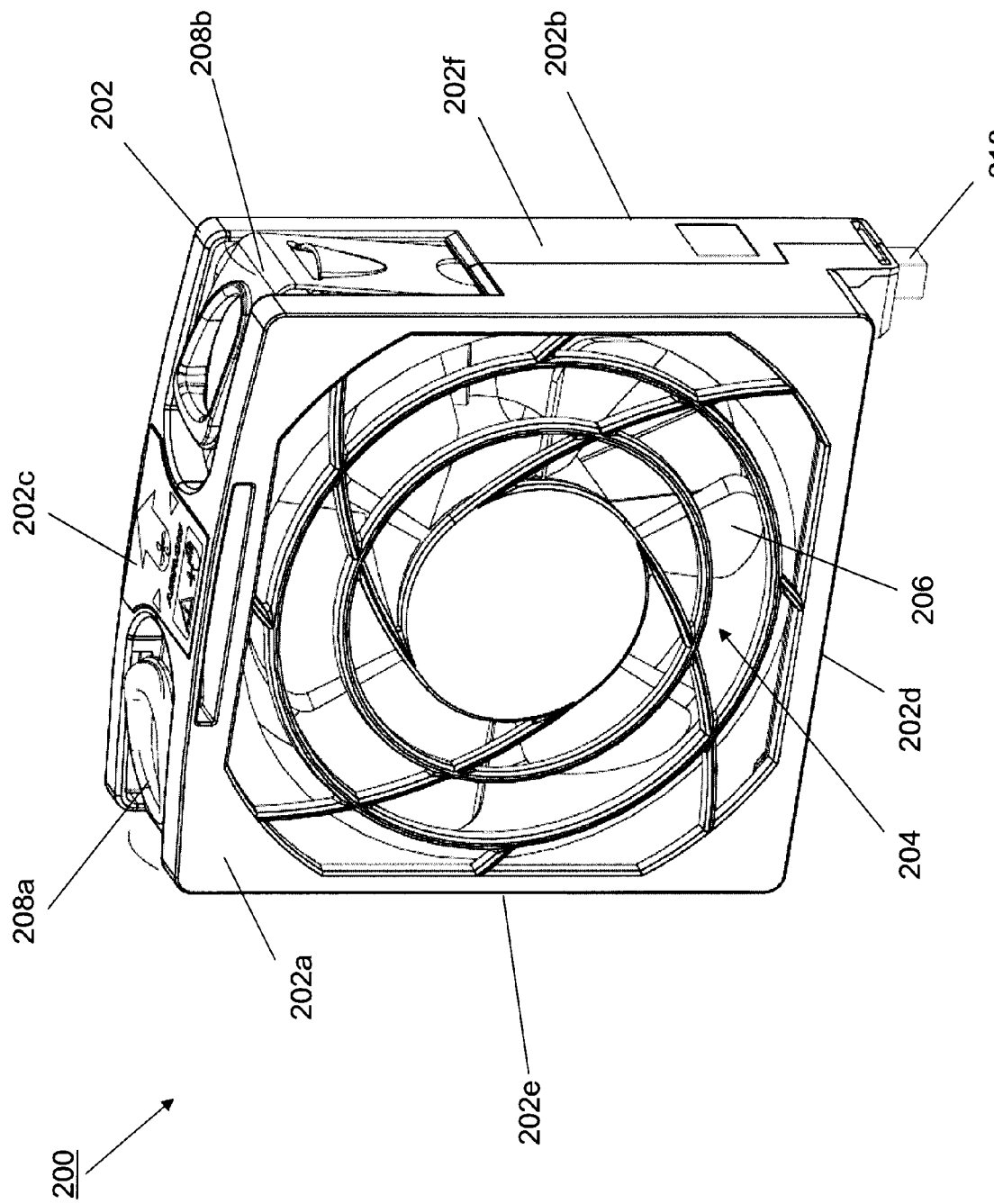
FIG. 2a is a front perspective view illustrating an embodiment of a fan.
Figure 2B:
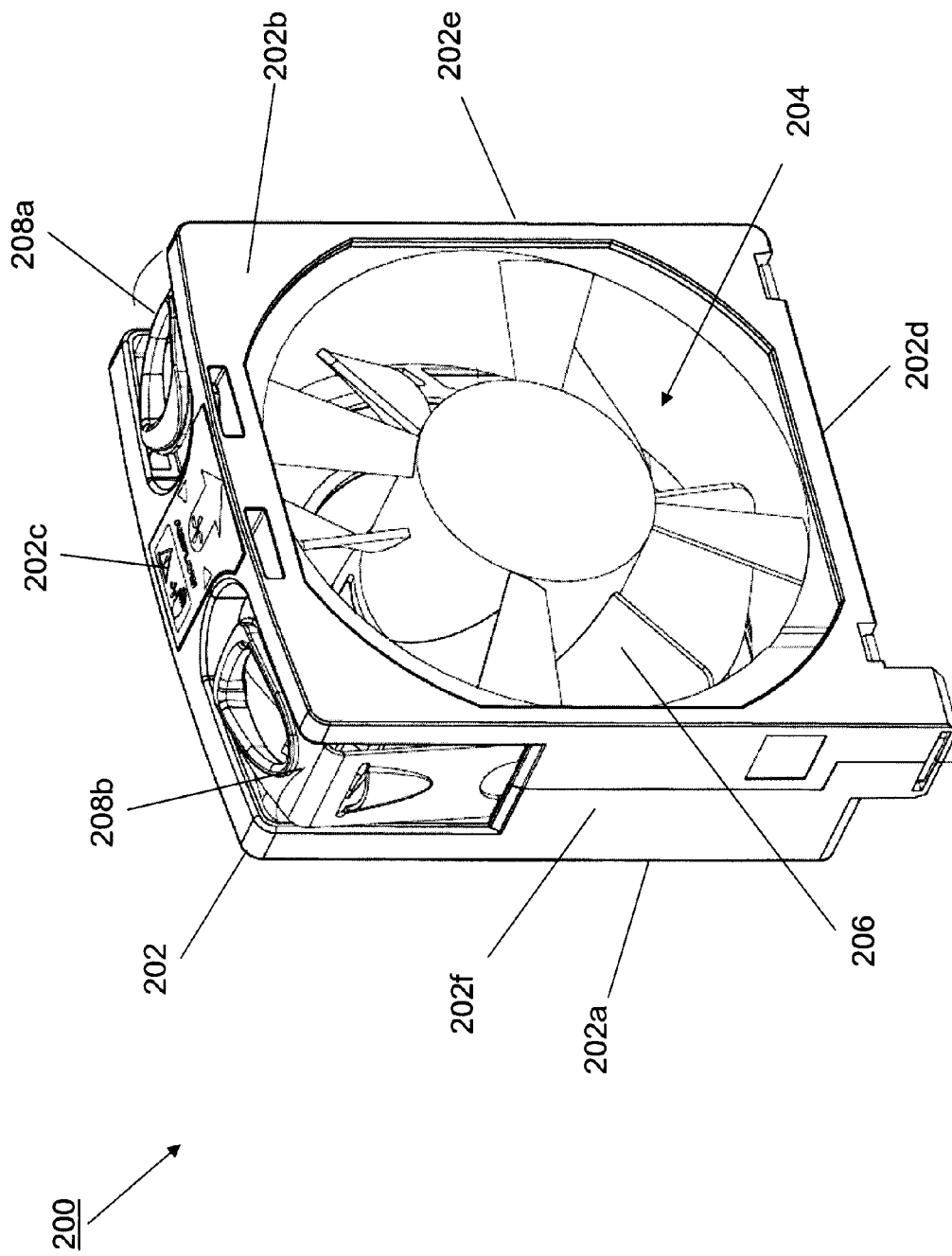

Referring now to FIGS. 2*a* and 2*b*, a fan 200 is illustrated. The fan 200 includes a base 202 having a front surface 202*a*, a rear surface 202*b* located opposite the base 202 from the front surface 202*a*, a top surface 202*c* extending between the front surface 202*a* and the rear surface 202*b*, a bottom surface 202*d* located opposite the top surface 202*c* and extending between the front surface 202*a* and the rear surface 202*b*, and a pair of opposing side surfaces 202*e* and 202*f* extending between the front surface 202*a*, the rear surface 202*b*, the top surface 202*c*, and the bottom surface 202*d*. A housing 204 is defined between the front surface 202*a*, the rear surface 202*b*, the top surface 202*c*, the bottom surface 202*d*, and the side surfaces 202*e* and 202*f* and a fan member 206 is moveably mounted in the housing 204 as is known in the art. A plurality of fan chassis coupling members 208*a* and 208*b* are moveably coupled to the base 202 adjacent the top surface 202*c* and the sides surface 202*e* and 202*f* and include a variety of features that interact with a fan chassis to couple the fan 200 to the fan chassis, as will be explained in further detail below. An electrical connector 210 extends from the bottom surface 202*d* adjacent the rear surface 202*b* and the side surface 202*f*.

Figure 3A:
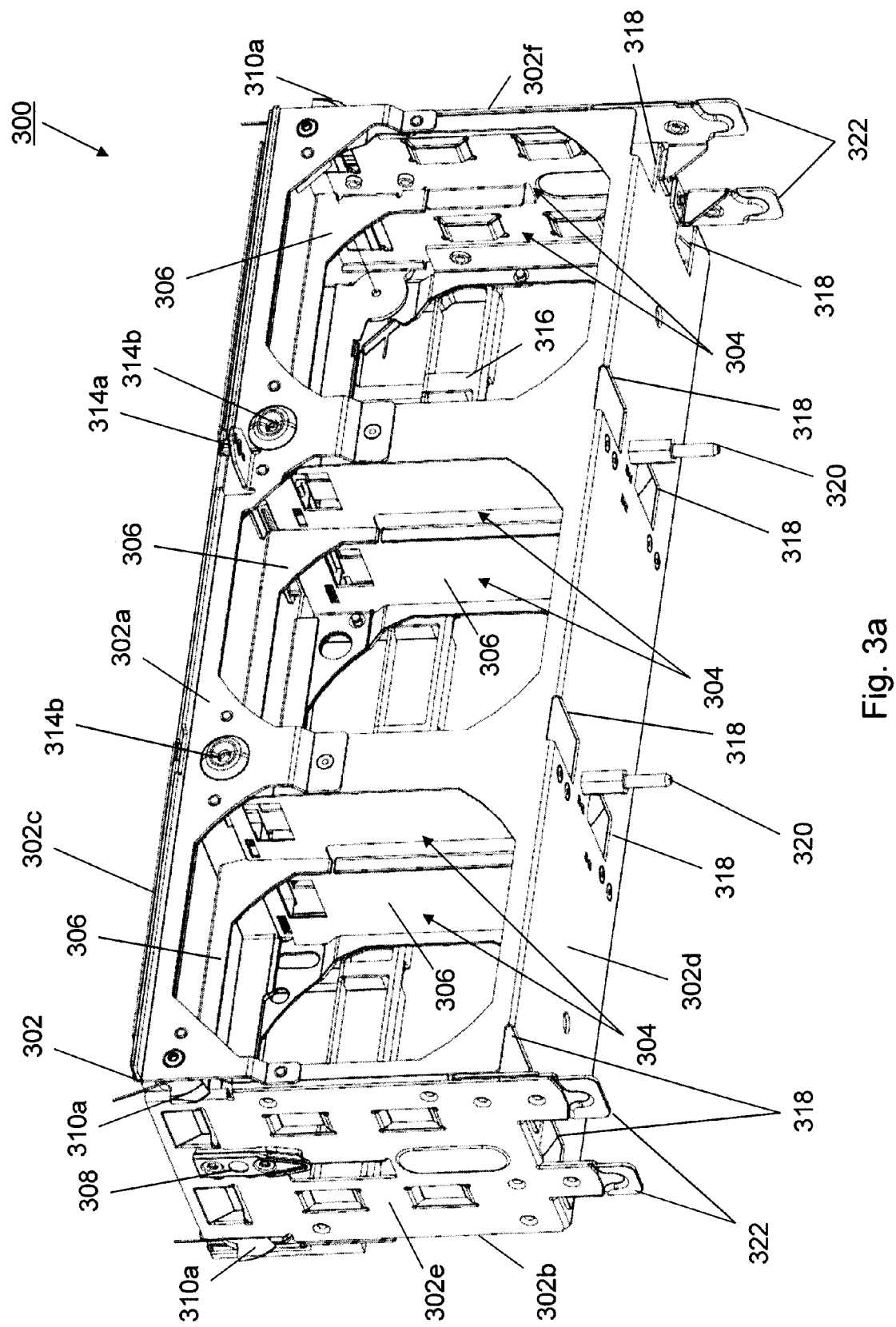
FIG. 3a is a front perspective view illustrating an embodiment of a fan chassis used with the fan of FIGS. 2a and 2b.
Figure 3B:
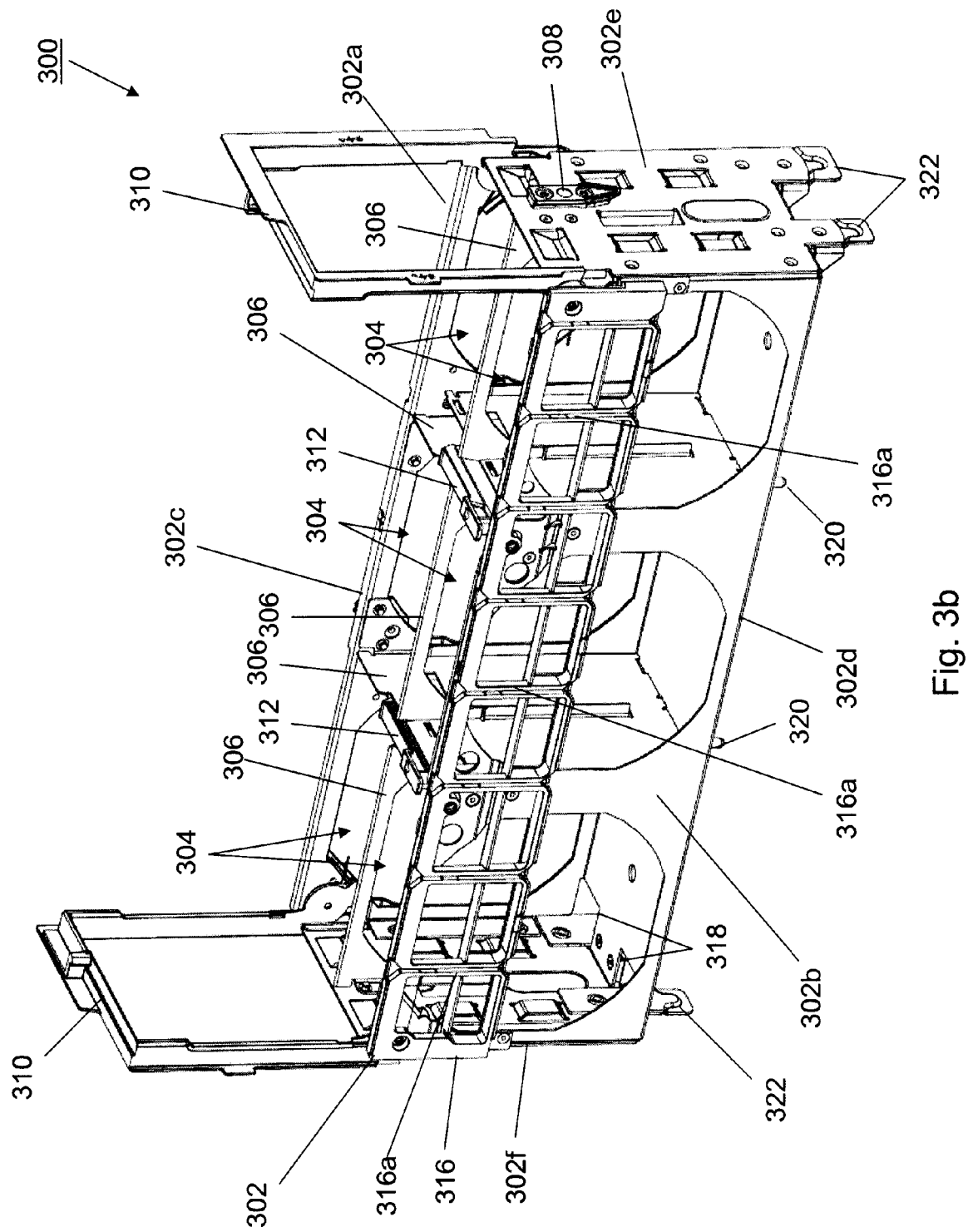

Referring now to FIGS. 3*a* and 3*b*, a fan chassis 300 is illustrated. The fan chassis 300 includes base 302 having a front surface 302*a*, a rear surface 302*b* located opposite the base 302 from the front surface 302*a*, a top surface 302*c* extending between the front surface 302*a* and the rear surface 302*b*, a bottom surface 302*d* located opposite the top surface 302*c* and extending between the front surface 302*a* and the rear surface 302*b*, and a pair of opposing side surfaces 302*e* and 302*f* extending between the front surface 302*a*, the rear surface 302*b*, the top surface 302*c*, and the bottom surface 302*d*. A plurality of fan housings 304 are defined between the front surface 302*a*, the rear surface 302*b*, the top surface 302*c*, the bottom surface 302*d*, the side surfaces 302*e* and 302*f*, and a plurality of interior walls 306. An IHS chassis guide member 308 is located on each of the side surface 302*e* and 302*f*. A pair of fan chassis handles 310 are rotatably coupled to the front surface 302*a* and the rear surface 302*b* adjacent each of the side surfaces 302*e* and 302*f* such that each fan chassis handle 310 is moveable between a closed position, illustrated in FIG. 3*a*, and an open position, illustrated in FIG. 3*b*. Each of the fan chassis handles 310 includes a pair of cam members 310*a* that extend past the side surfaces 302*e* and 302*f* when the fan chassis handle 310 is in the closed position, as illustrated in FIG. 3*a*. A pair of handle latches 312 are coupled to the interior walls 306 adjacent the top surface 302*c* and are operable to engage the fan chassis handles 310 and hold the fan chassis handles 310 in the closed position, as illustrated in FIG. 3*a*. An IHS chassis cover anchor is located on the front surface 302*a* and includes a cover latch 314*a* that extends from the front surface 302*a* and a pair of guide pin apertures 314*b* that extend through the front surface 302*a*. A guide member 316 is coupled to the rear surface 302*b* and defines a plurality of guide channels 316*a* adjacent the rear surface 302*b*. A plurality of connector apertures 318 are defined by the bottom surface 302*d* and extend through the bottom surface 302*d* from the fan housings 304. A pair of board support members 320 extend from the bottom surface 302*d* and are each located between a pair of connector apertures 318. A plurality of feet 322 extend from the side surface 302*e* and 302*f* adjacent the bottom surface 302*d*. In an embodiment, the plurality of feet 322 are sized to extend at least as far from, or further from, the bottom surface 302*d* as the board support members 320 such that the plurality of feet 322 may support the fan chassis 300 on a support surface such that the bottom surface 302*d* is substantially parallel to the support surface. In an embodiment, isolation material may be included on various components of the fan chassis 300 such as, for example, the fan chassis handles 310, the board support members 320, and/or a variety of other components, in order to vibration isolate the fan chassis 300 from the IHS chassis 400.

Figure 4:
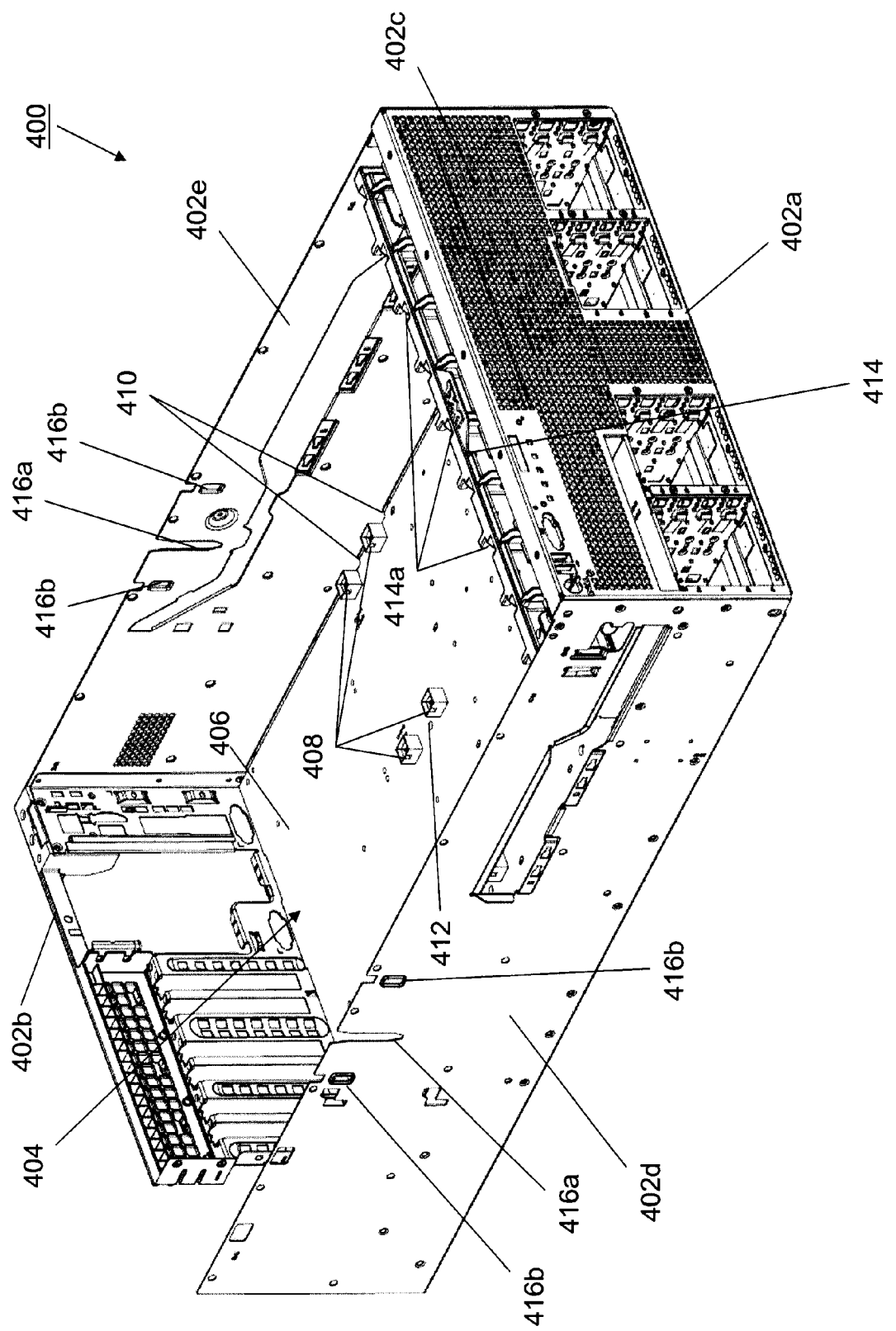
FIG. 4 is a perspective view illustrating an embodiment of an IHS chassis used with the fan of FIGS. 2a and 2b and the fan chassis of FIGS. 3a and 3b.

Referring now to FIG. 4, an IHS chassis 400 is illustrated. In an embodiment, the IHS chassis 400 may be the chassis 116 described above with reference to FIG. 1. The IHS chassis 400 includes a bottom wall 402*a*, a front wall 402*b* that extends substantially perpendicularly from the bottom wall 402*a*, a rear wall 402*c* that extends substantially perpendicularly from the bottom wall 402*a* and opposite the bottom wall 402*a* from the front wall 402*b* such that it is substantially parallel to the front wall 402*b*, a side wall 402*d* that extends substantially perpendicularly from the bottom wall 402*a* and between the front wall 402*a* and the rear wall 402*b*, and a side wall 402*e* that extends substantially perpendicularly from the bottom wall 402*a*, opposite the bottom wall 402*a* from the side wall 402*d*, and between the front wall 402*b* and the rear wall 402*c* such that it is substantially parallel to the side wall 402*d*. An IHS chassis housing 404 is defined between the bottom wall 402*a*, the front wall 402*b*, the rear wall 402*c*, and the sides walls 402*d* and 402*e*. A board 406 is located in the IHS chassis housing 404 adjacent the bottom wall 402*a*. In an embodiment, the board 406 may be a circuit board known in the art and may includes some or all of the components of the IHS 100, described above with reference to FIG. 1. A plurality of fan couplings 408 are located on the board 406. A plurality of feet apertures 410 are defined by the board 406. A plurality of board support apertures 412 are defined by the board 406 and located between pairs of fan couplings 408. A guide member 414 is coupled to the rear wall 402*c* and defines a plurality of guide member channels 414*a*. Each of the side walls 402*d* and 402*e* define a fan chassis guide channel 416*a* that extends into the sidewalls 402*d* and 402*e* from an upper edge, and a pair of cam member apertures 416*b* that extend through the side walls 402*d* and 402*e* and that are located on opposite sides of the fan chassis guide channel 416*a*.

Figure 5:
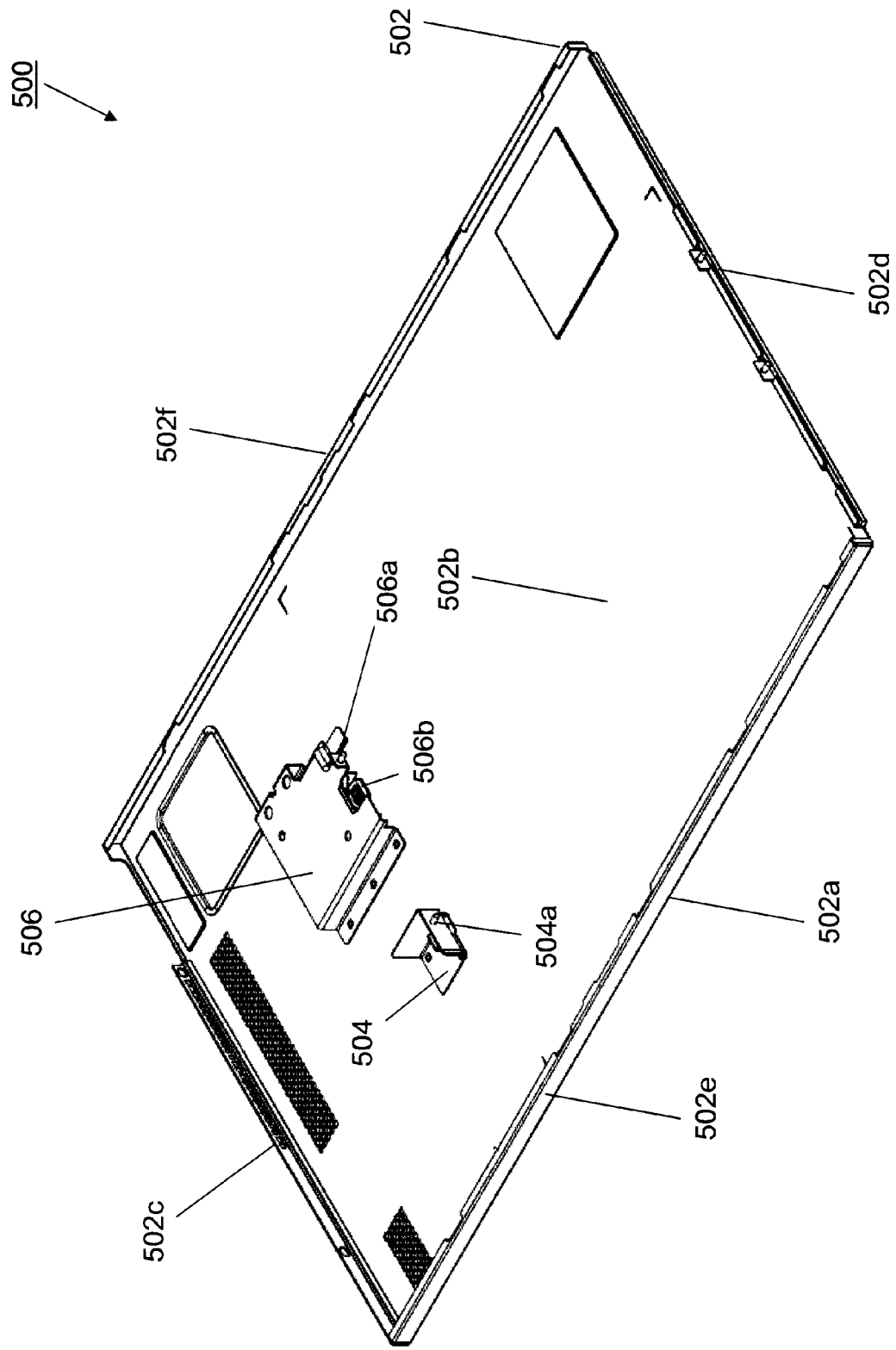
FIG. 5 is a perspective view illustrating an embodiment of an IHS chassis cover used with the fan chassis of FIGS. 3a and 3b and the IHS chassis of FIG. 4.

Referring now to FIG. 5, an IHS chassis cover 500 is illustrated. In an embodiment, the IHS chassis cover 500 includes a base 502 having a top surface 502*a*, a bottom surface 502b located opposite the base 502 from the top surface 502a, a front edge 502c extending between the top surface 502a and the bottom surface 502b, a rear edge 502d located opposite the front edge 502c and extending between the top surface 502a and the bottom surface 502b, and a pair of opposing side edges 502e and 502f extending between the top surface 502a, the bottom surface 502b, the front edge 502c, and the rear edge 502d. A pair of coupling structures 504 and 506 extend from the bottom surface 502b of the chassis cover 500. A guide pin 504a extends from the coupling structure 504 in a substantially parallel orientation to the bottom surface 502b. A guide pin 506a extends from the coupling structure 506 in a substantially parallel orientation to the bottom surface 502b, and a latch 506b is located on the coupling structure 506 adjacent the guide pin 506a.

Figure 6A:
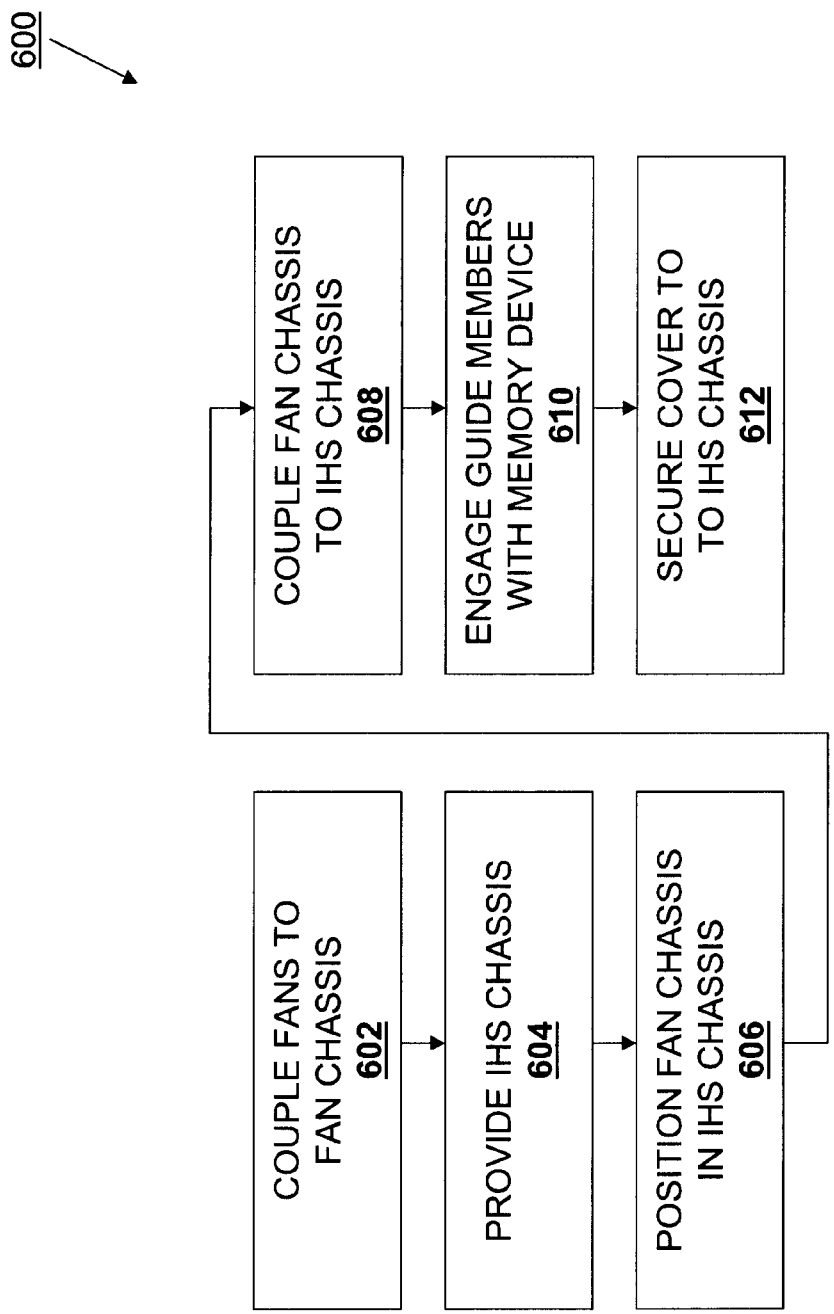
FIG. 6a is a flow chart illustrating an embodiment of a method for mounting fans in an IHS chassis.
Figure 6B:
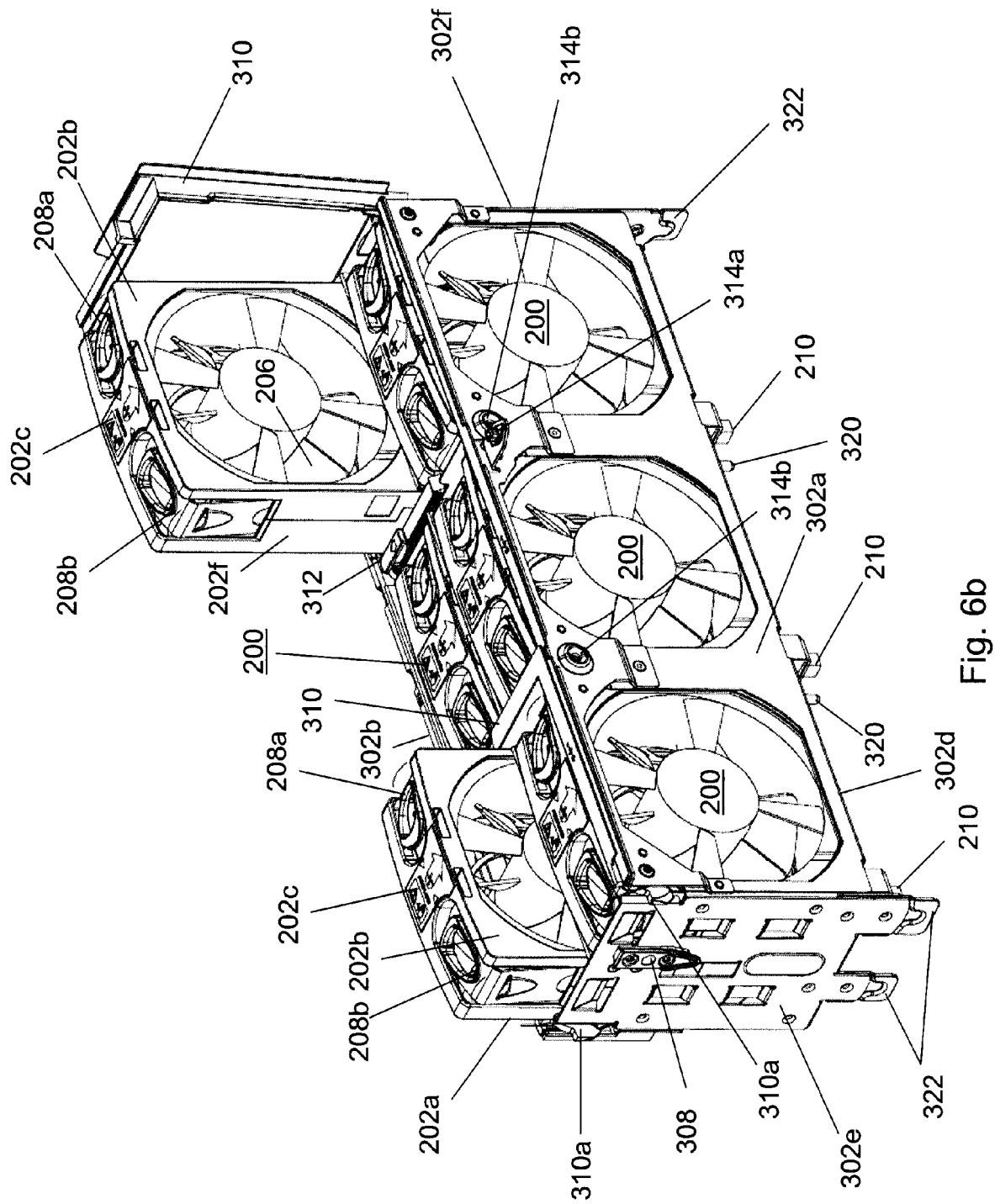
FIG. 6b is a perspective view illustrating an embodiment of a plurality of the fans of FIGS. 2a and 2b being positioned in and coupled to the fan chassis of FIGS. 3a and 3b.
Figure 6C:
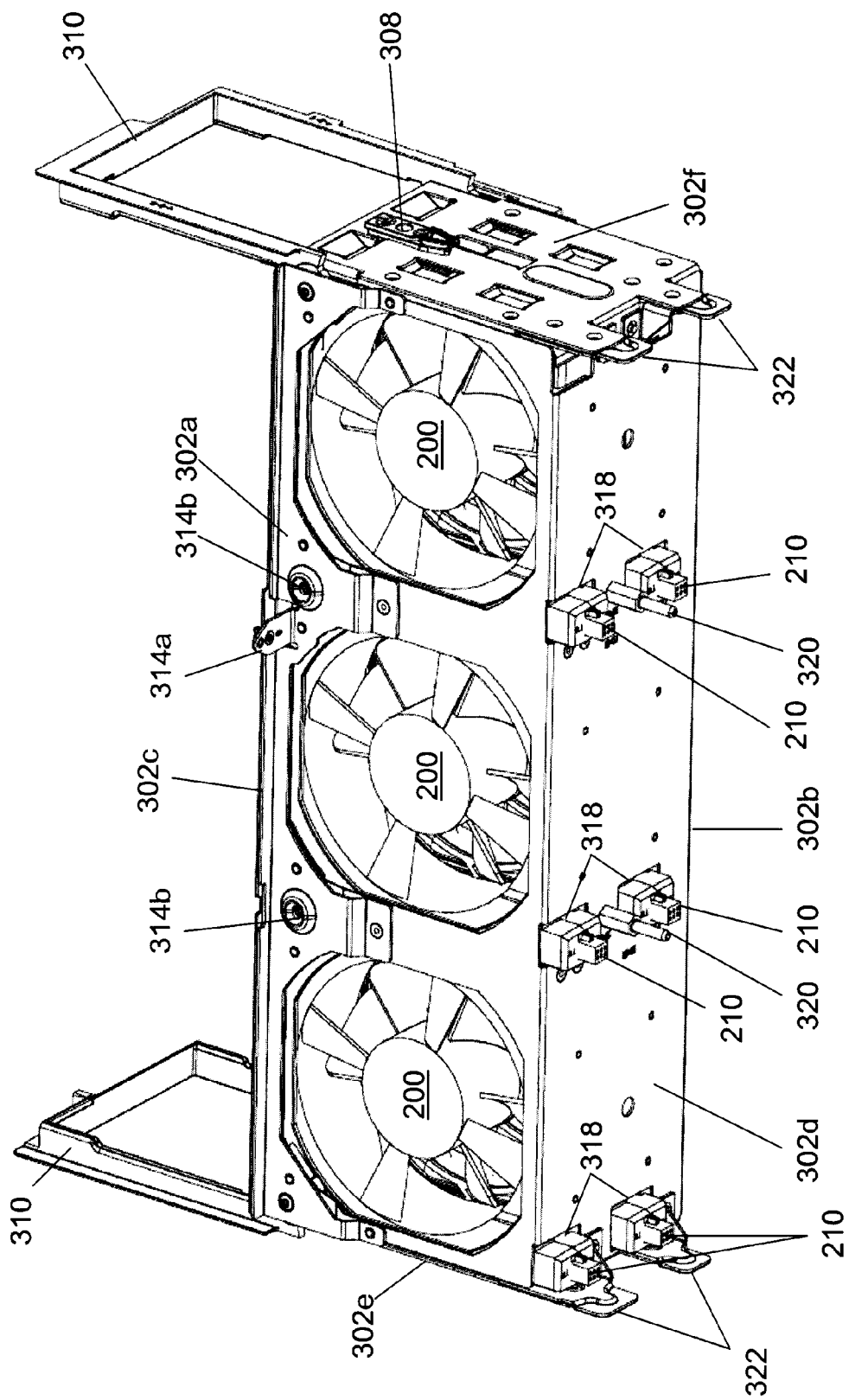
FIG. 6c is a perspective view illustrating an embodiment of a plurality of the fans of FIGS. 2a and 2b positioned in and coupled to the fan chassis of FIGS. 3a and 3b.

Referring now to FIGS. 2a, 2b, 3a, 3b, 6a, 6b, and 6c, a method 600 for mounting fans in an IHS is illustrated. The method 600 begins at block 602 where fans are coupled to a fan chassis. A plurality of the fans 200 may be coupled to the fan chassis 300 by positioning each fan 200 adjacent a respective fan housing 304 such that the bottom surface 202d of the fan 200 is adjacent the fan housing 304. The fan 200 is then moved into the fan housing 304 until the electrical connector 210 on the fan 200 extends through the connector aperture 318 defined by the fan chassis 300. In an embodiment, features on the fan 200 and/or the fan chassis coupling members 208a and 208b engage the fan chassis 300 to secure the fans 200 to the fan chassis 300. Furthermore, the fan chassis coupling members 208a and 208b may be actuated (e.g., by moving them towards each other) to disengage such features so that the fans 200 may be decoupled from the fan chassis 300 and removed from the fan housings 304. As illustrated in FIG. 6b, the fan chassis handles 310 may be positioned in either the open position or the closed position, described above, while the fans 200 are coupled to the fan chassis 300 (allowing the fans 200 to be positioned in and coupled to the fan chassis 300 when the fan chassis 300 is coupled to the IHS chassis 400, discussed in further detail below). As illustrated in FIG. 6c, the fan chassis handles 310 may be positioned in the open position to allow the fan chassis 300 including the fans 200 to be easily supported and carried by a user. Furthermore, the feet 322 extend adjacent the bottom surface 302d of the fan chassis 300 and at least as far from the bottom surface 302d as the electrical connectors 210 and the board support members 320 so that the feet 322 may be used to support the fan chassis 300 on a support surface such that the handles 310 are oriented substantially perpendicularly from the support surface when they are in the open position. In the embodiment described below, the fans 200 may be coupled to the fan chassis 300 while the fan chassis 300 is located in the IHS chassis 400, prior to the fan chassis 300 being positioned in the IHS chassis 400, or both prior to and while the fan chassis 300 is located in the IHS chassis 400.

Figure 6D:
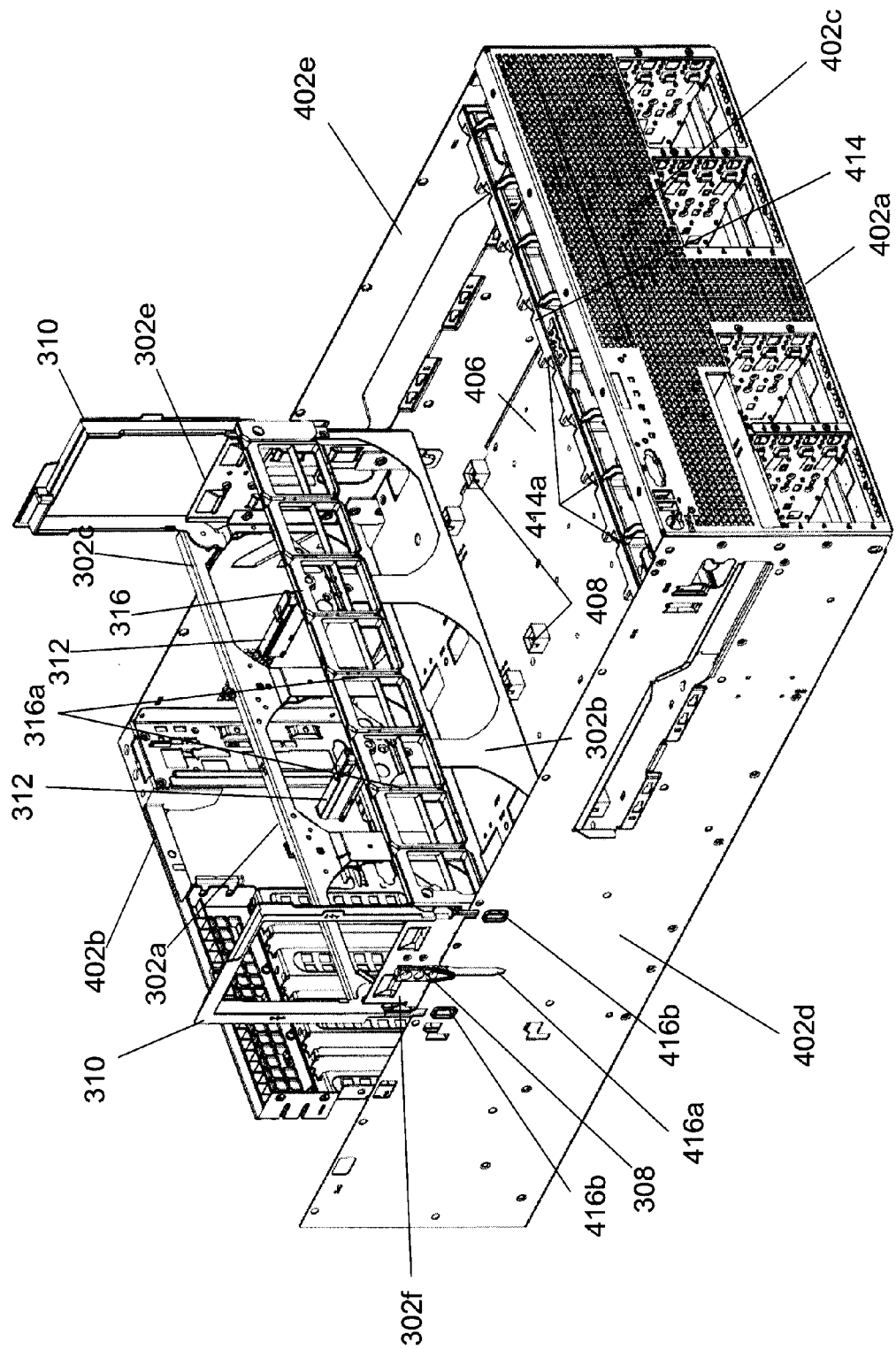
FIG. 6d is a perspective view illustrating an embodiment of the fan chassis of FIGS. 3a and 3b being coupled to the IHS chassis of FIG. 4.
Figure 6E:
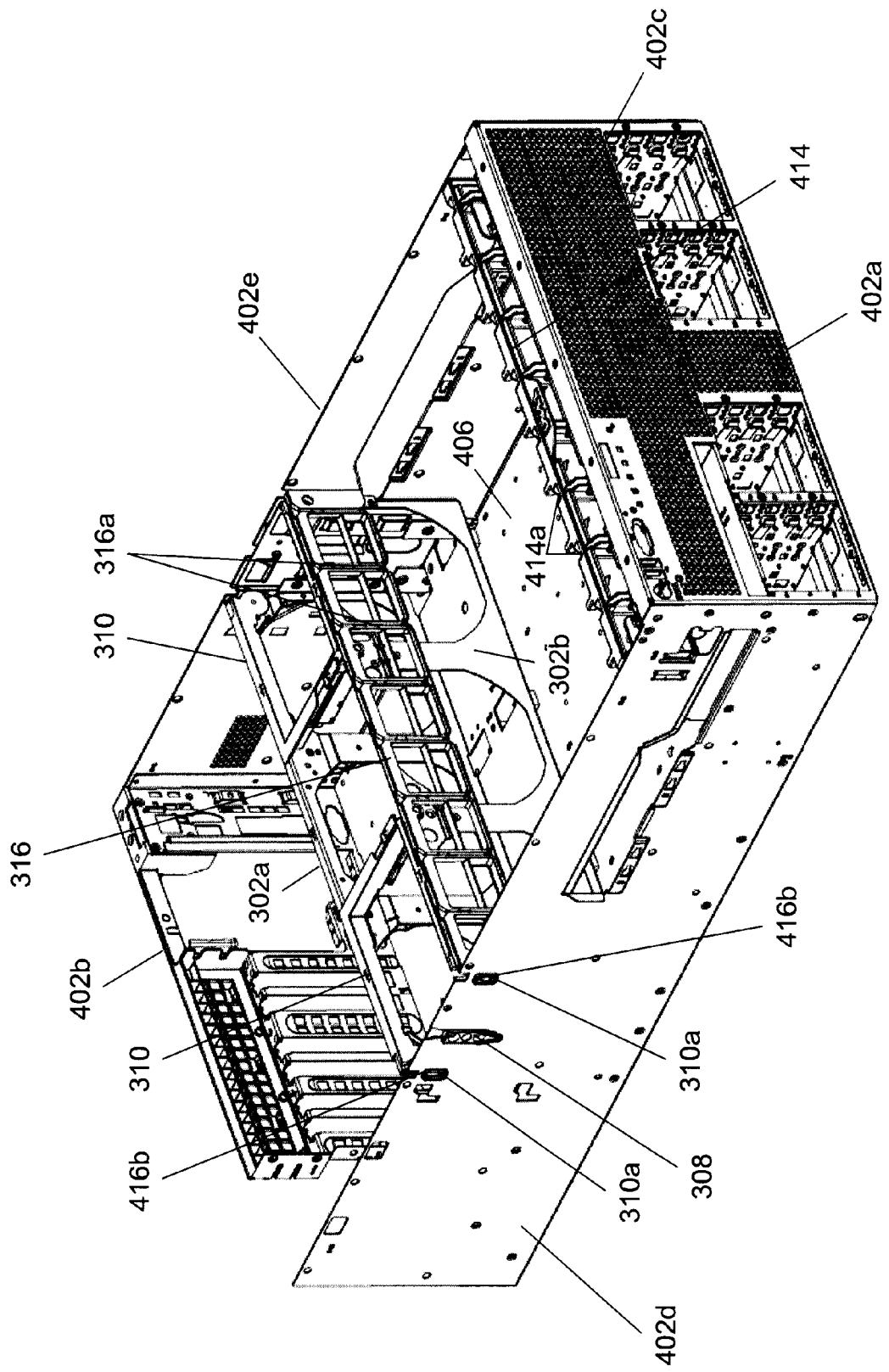
FIG. 6e is a perspective view illustrating an embodiment of the fan chassis of FIGS. 3a and 3b coupled to the IHS chassis of FIG. 4.
Figure 6F:
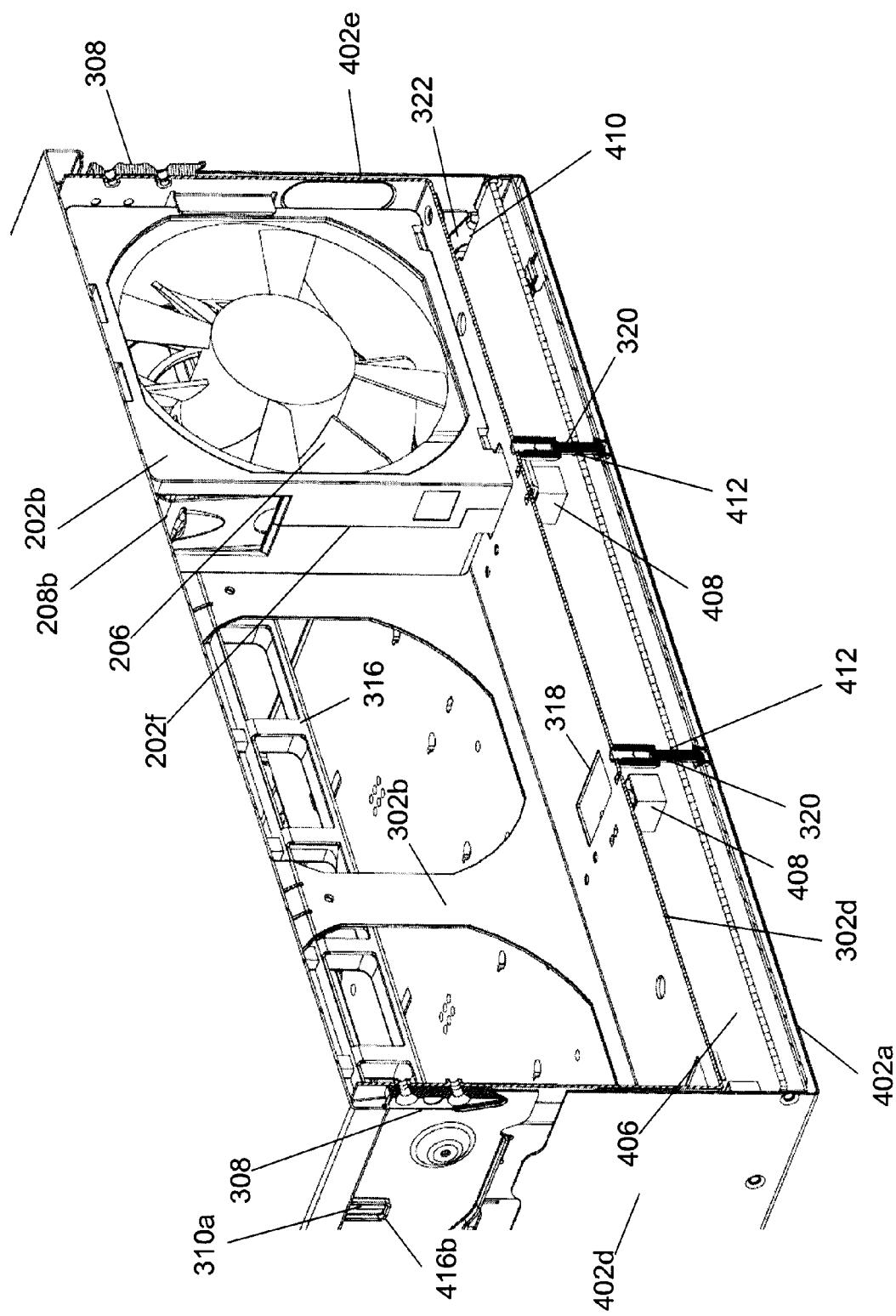
FIG. 6f is a cross-sectional perspective view illustrating an embodiment of the fan chassis of FIGS. 3a and 3b coupled to the IHS chassis of FIG. 4.

Referring now to FIGS. 3a, 3b, 4, 6a, 6d, 6e, and 6f, the method 600 proceeds to block 604 where an IHS chassis is provided. In an embodiment, the IHS chassis 400, described above with reference to FIG. 4, is provided. The method 600 then proceeds to blocks 606 and 608 where the fan chassis is positioned in and coupled to the IHS chassis. The fan chassis handles 310 on the fan chassis 300, illustrated in FIG. 6d without the fans 200 located in the fan housings 304, are positioned in the open position, as illustrated in FIG. 6d, and the fan chassis 300 is positioned adjacent the IHS chassis 400 such that the bottom surface 302d of the fan chassis 300 is located adjacent the IHS chassis housing 404 and the IHS chassis guide members 308 on the fan chassis 300 are aligned with the fan chassis guide channels 416a defined by the IHS chassis 400. The fan chassis 300 is then moved into the IHS chassis housing 404 such that the IHS chassis guide members 308 move into the fan chassis guide channels 416a. As the fan chassis 300 is moved further into the IHS chassis housing 404, the IHS chassis guide members 308 become seated in the fan chassis guide channels 416a. In an embodiment, if the fans 200 are positioned in the fan housings 304 during the positioning of the fan chassis 300 in the IHS chassis housing 400, described above, the electrical connectors 210 on the fans 200 will engage the fan couplings 408 on the board 406. The fan chassis handles 310 may then be moved from the open position towards the closed position and, in response, the cam members 310a on the fan chassis handles 310 will engage the IHS chassis side walls 402e and 402f through the cam member apertures 416b. Movement of the fan chassis handles 310 into the closed position, illustrated in FIG. 6e, provides a camming mechanism using the cam members 310a and the cam member apertures 416b in the IHS chassis side walls 402e and 402f to couple the fan chassis 300 to the IHS chassis 400. The camming mechanism also may provide a mating force to mate the electrical connectors 210 on the fans 200 with the fan couplings 408 on the board 406 when the fans 200 are positioned in the fan housings 304 on the fan chassis 300. Thus, the camming mechanism may provides high insertion forces necessary to mate large fans to the board 406. The positioning and coupling of the fan chassis 300 to the IHS chassis 400 also results in the board support members 320 moving through the board support apertures 412 defined by the board 406 and into engagement with the IHS chassis 400. The positioning of the board support members 320 in the board support apertures 412 may provide structural support for the board 406 during shock and vibration events by, for example, preventing relative motion of the board 406 and the IHS chassis 400. In an embodiment, the IHS chassis 400 may include features in the bottom wall 402a, illustrated in FIG. 6f, that constrain movement of the board support members 320 in multiple axes, thereby restraining movement of the fan chassis 300 relative to the IHS chassis 400 during shock and vibration events. In an embodiment, with the fan chassis 300 coupled to the IHS chassis 400, the guide channels 316a defined by the guide member 316 on the fan chassis 300 are substantially aligned with respective guide channels 414a defined by the guide member 414 on the IHS chassis 400.

Figure 6G:
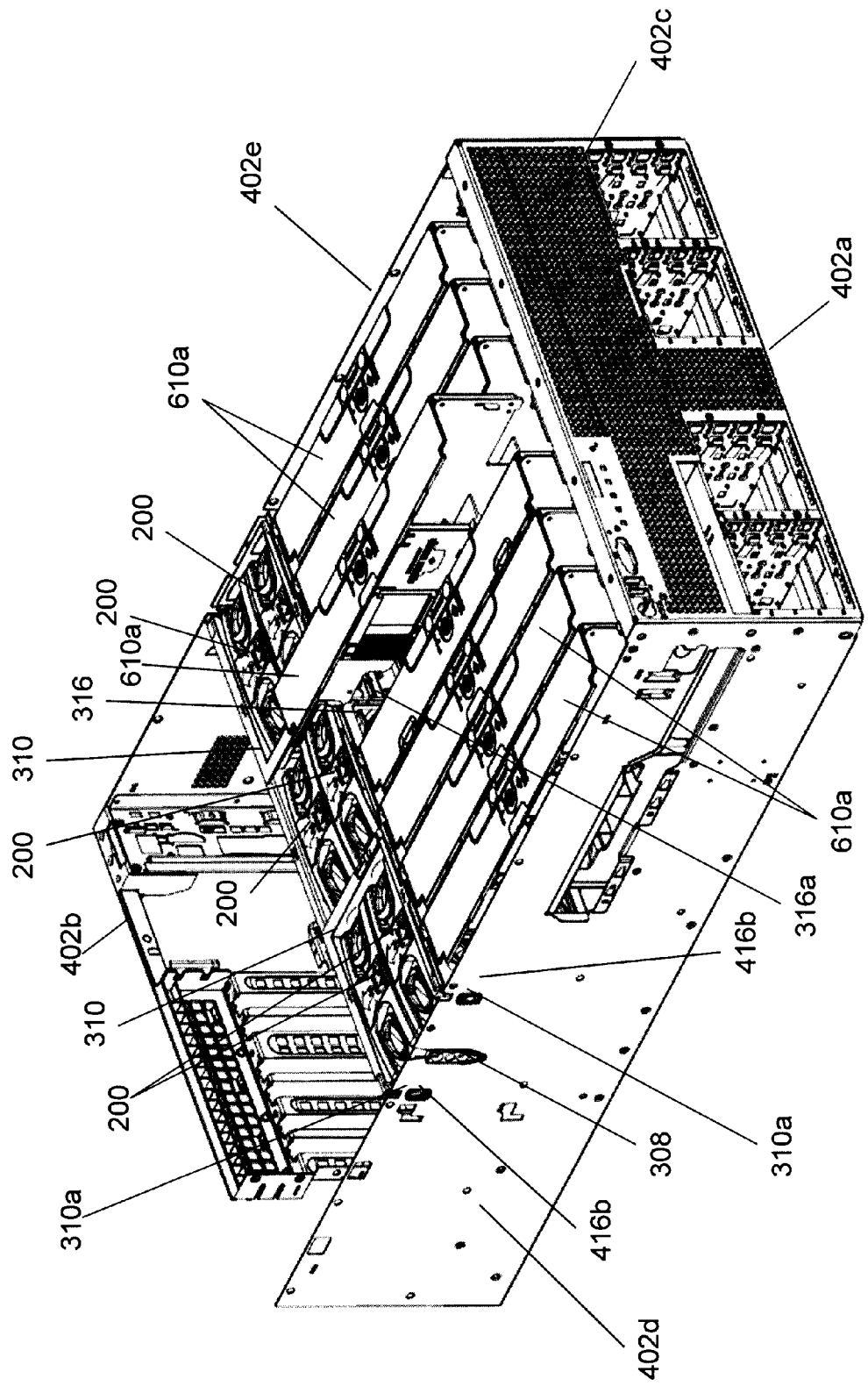
FIG. 6g is a perspective view illustrating an embodiment of the fan chassis of FIGS. 3a and 3b including a plurality of the fans of FIGS. 2a and 2b and coupled to the IHS chassis of FIG. 4, and a plurality of memory devices coupled to the fan chassis and the IHS chassis.
Figure 6H:
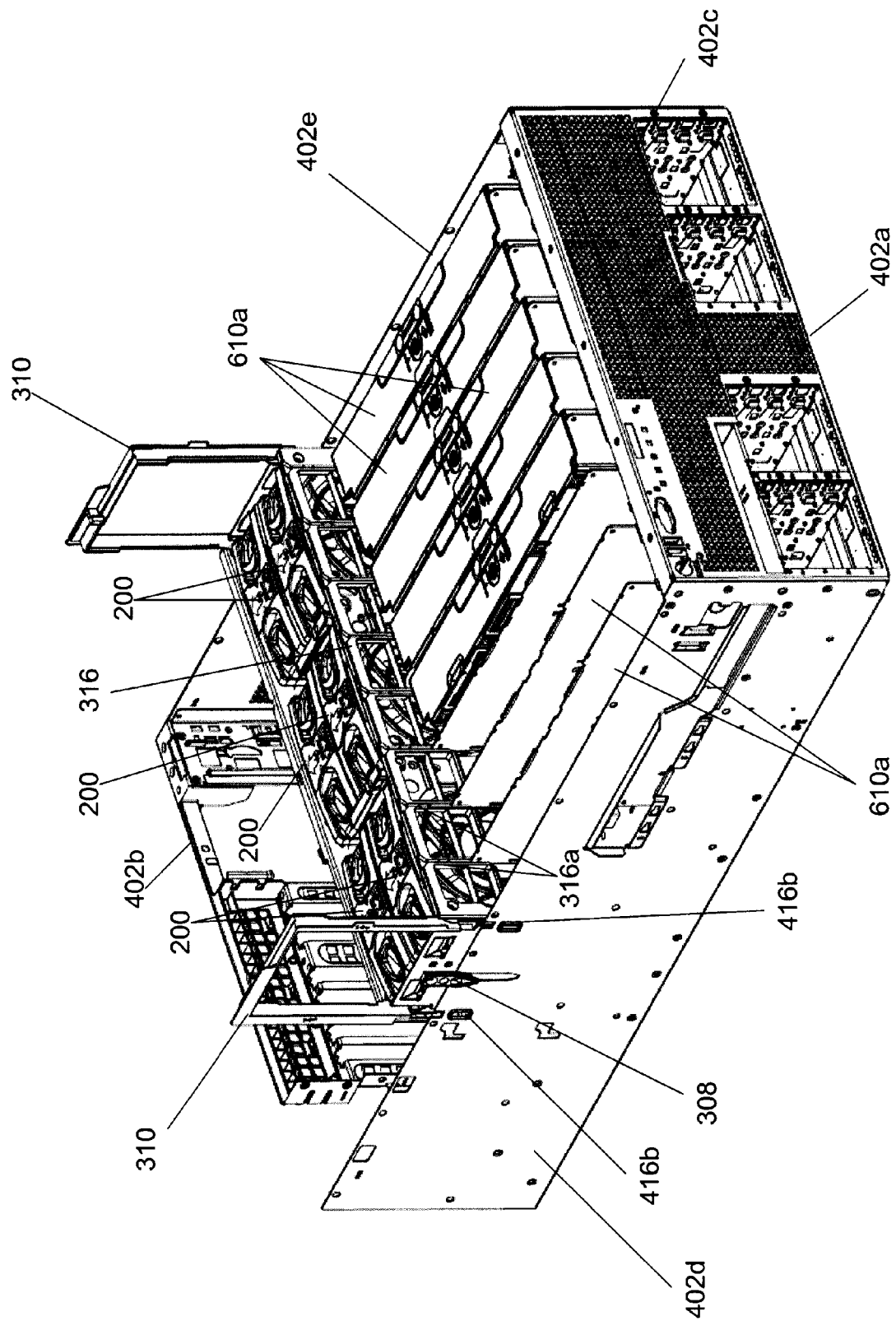
FIG. 6h is a perspective view illustrating an embodiment of the fan chassis of FIGS. 3a and 3b including a plurality of the fans of FIGS. 2a and 2b and being removed from the IHS chassis of FIG. 4 while a plurality of memory devices remain coupled to the IHS chassis.

Referring now to FIGS. 3a, 3b, 4, 6a, 6g, and 6h, the method 600 proceeds to block 610 where the guide members are engaged with memory devices. A plurality of memory devices 610a may be positioned in the IHS chassis housing 404 and coupled to the board 406 by positioning opposing edges of each memory device 610a in respective guide member channels 316a and 414a and on the guide members 316 and 414 and moving the memory devices 610a into the IHS chassis housing 404 until the memory devices 610a mate with connectors (not illustrated) that are located on the board 406. In an embodiment, as illustrated in FIG. 6g, the memory devices 610a may engage the guide members 316 and 414 and be coupled to the board 406 while the fan chassis 300 is coupled to the IHS chassis 400. In an embodiment, as illustrated in FIG. 6h, the fan chassis 300 may be decoupled from the IHS chassis 400 (e.g., by moving the fan chassis handles 310 from the closed position to the open position) and removed from the IHS chassis housing 404 while the memory devices 610a are coupled to the board 406. Thus, the memory devices 610a may be coupled to the board 406 either while the fan chassis 300 is coupled to the IHS chassis 400 by engaging each of the guide members 316 and 414 or when the fan chassis 300 is not coupled to the IHS chassis 400 by engaging only the guide member 414 (i.e., either the guide member 414 or the guide members 316 and 414 may be used to blind mate the memory devices 610a with connectors on the board 406), the fan chassis 300 may be decoupled from the IHS chassis 400 and removed from the IHS chassis housing 404 while the memory device 610a are coupled to the board 406, and the fan chassis 300 may be positioned in the IHS chassis housing 404 and coupled to the IHS chassis 400 while the memory devices 610a are coupled to the board 406.

Figure 6I:
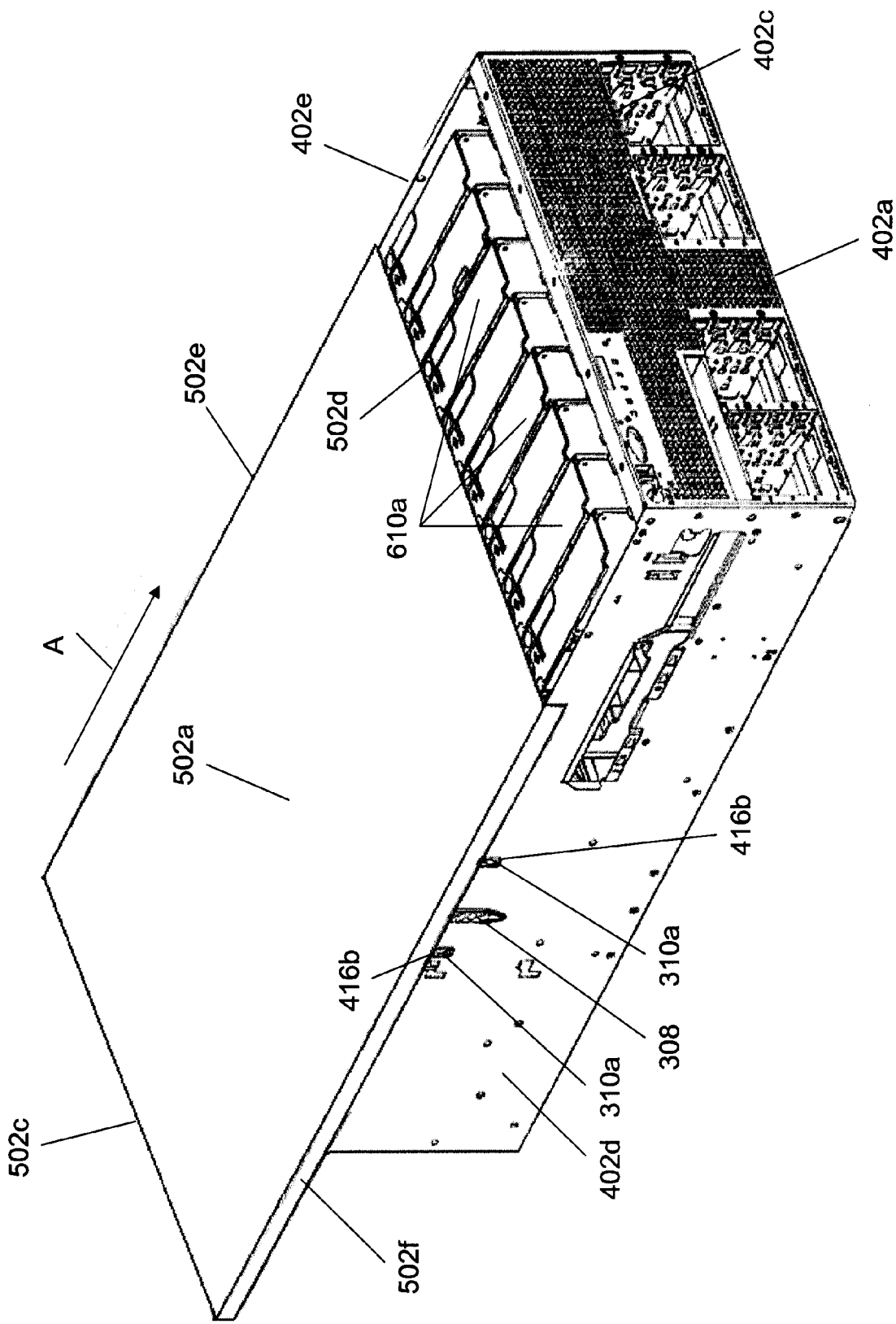
FIG. 6i is a perspective view illustrating an embodiment of the IHS chassis cover of FIG. 5 being coupled to the IHS chassis of FIG. 4 including the fan chassis of FIGS. 3a and 3b and the memory devices.
Figure 6J:
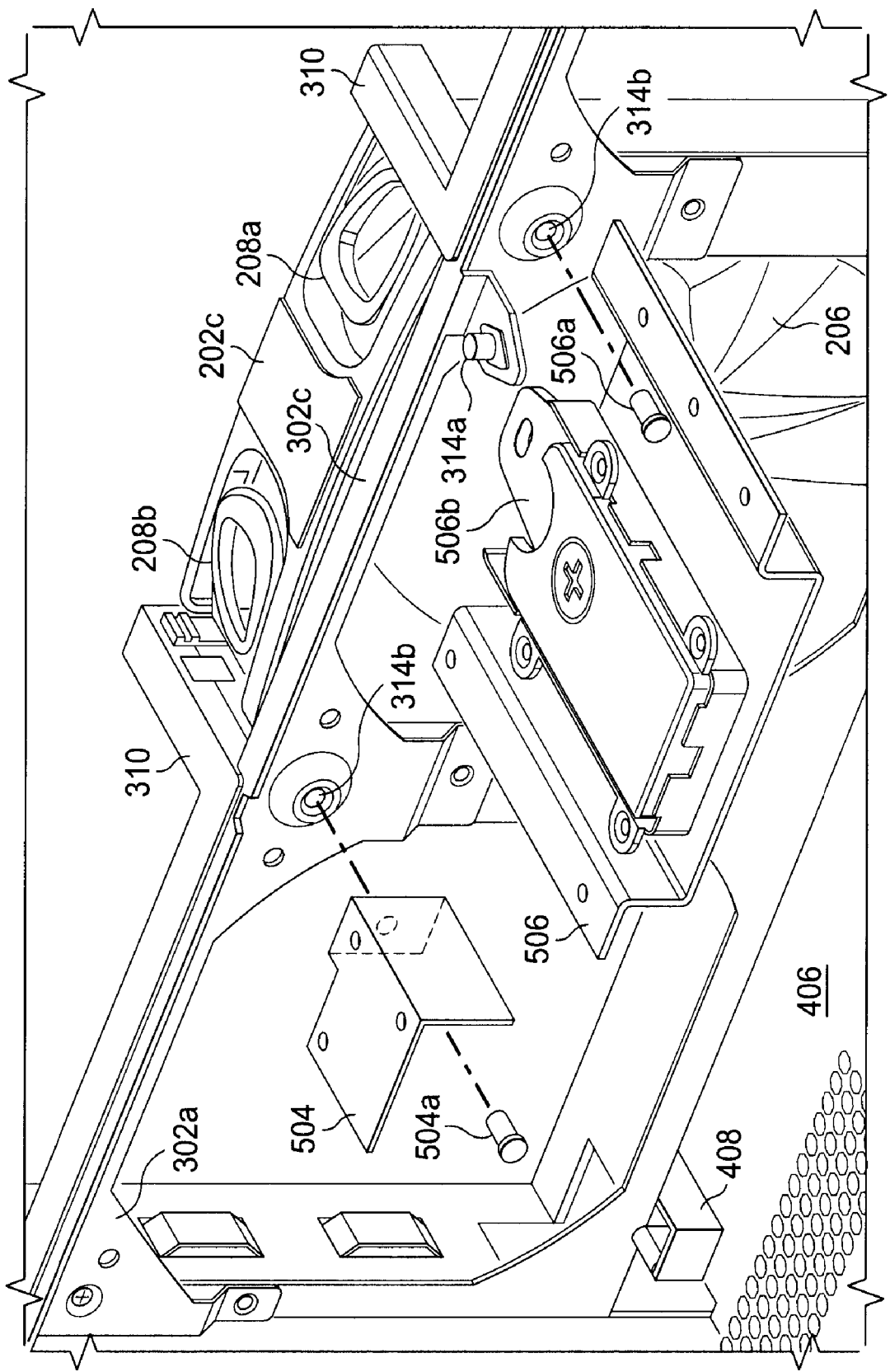
FIG. 6j is a cut-away perspective view illustrating an embodiment of the IHS chassis cover of FIG. 5 being coupled to the IHS chassis of FIG. 4 and the fan chassis of FIGS. 3a and 3b.
Figure 6K:
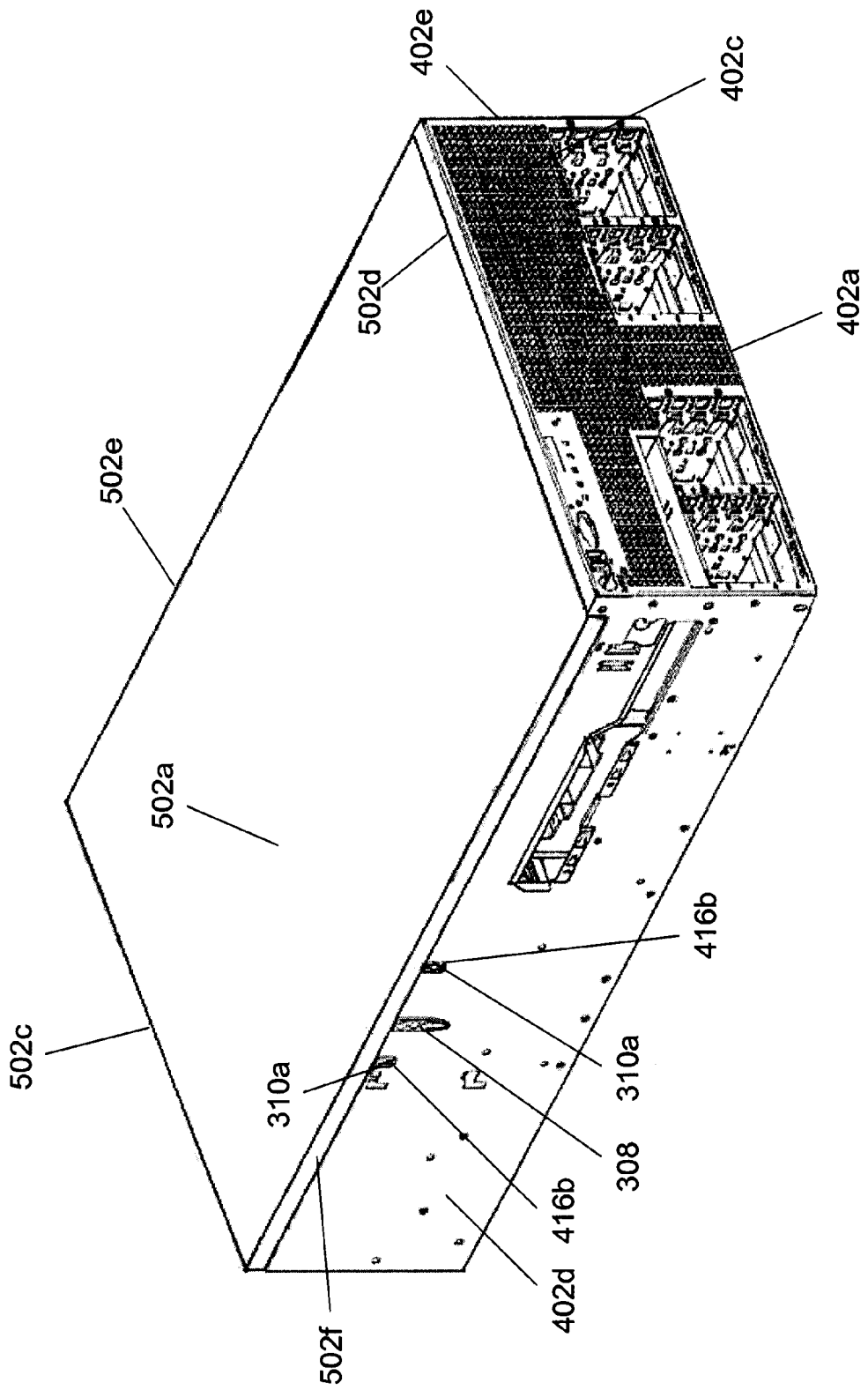
FIG. 6k is a perspective view illustrating an embodiment of the IHS chassis cover of FIG. 5 coupled to the IHS chassis of FIG. 4 and the fan chassis of FIGS. 3a and 3b.

Referring now to FIGS. 3a, 3b, 4, 5, 6a, 6i, 6j, and 6k, the method 600 proceeds to block 612 where a cover is secured to the IHS chassis. In an embodiment, the IHS chassis cover 500 illustrated in FIG. 5 is positioned on the IHS chassis 400 such that the bottom surface 502b faces the IHS chassis housing 404 with the side edge 502f located adjacent the side wall 402d on the IHS chassis 400 and the side edge 502e located adjacent the side wall 402e on the IHS chassis 400, as illustrated in FIG. 6i. With the IHS chassis cover 500 positioned on the IHS chassis 400 as illustrated in FIG. 6i, the latch 506b and the guide pins 504a and 506a on the IHS chassis cover 500 are substantially aligned with the cover latch 314a and the guide pin apertures 314b, respectively, on the fan chassis 300, as illustrated in FIG. 6j. The IHS chassis cover 500 is then moved in a direction A such that guide pins 504a and 506a enter the guide pin apertures 314b and the latch 506b engages the cover latch 314a. With the guide pins 504a and 506a located in the guide pin apertures 314b and the latch 506b engaging the cover latch 314a, the IHS chassis cover 500 is secured to the IHS chassis 400, as illustrated in FIG. 6k. Furthermore, the locating of the guide pins 504a and 506a in the guide pin apertures 314b, along with the coupling of the fan chassis 300 to the IHS chassis 400, provides structural support to the IHS chassis/IHS chassis cover combination such that the entire system may be lifted by creating a vacuum seal on the top surface 502a of the IHS chassis cover 500 using vacuuhoisting methods known in the art. In an embodiment, other features may be included on the IHS chassis 400 and IHS chassis cover 500 to couple the IHS chassis cover 500 to the IHS chassis 400.

Thus, a fan mounting system has been described that houses a plurality of fans and allows those fans to be coupled to an IHS chassis. The fan mounting system provides versatility in fan mounting by allowing the fans to be individually coupled to and decoupled from the IHS chassis, or allowing the plurality of fans to be coupled and decoupled from the IHS chassis at the same time. The fan mounting system also provides versatility in memory device mounting by allowing memory devices to be coupled to and decoupled from the IHS chassis whether or not the fan chassis is coupled to the IHS chassis, while providing additional support to the memory devices when the fan chassis is coupled to the IHS chassis. The versatility provided in a fan, fan chassis, and memory device coupling to the IHS chassis prevents the user from being constrained by order-of-assembly requirements. Furthermore, the fan mounting system provides a major structural element to the entire system by providing IHS chassis cover retention that allows the vacuuhoisting of the entire system using the IHS chassis cover.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A fan mounting system, comprising:
a fan chassis defining a plurality of fan housings;
a guide member located on the fan chassis;
at least one board support member extending from the fan chassis, wherein the at least one board support member is operable to extend through a board to engage an Information Handling System (IHS) chassis when the fan chassis is positioned in the IHS chassis; and
an IHS chassis cover anchor located on the fan chassis, wherein the IHS chassis cover anchor is operable to engage an IHS chassis cover and secure the IHS chassis cover to the IHS chassis when the fan chassis is coupled to the IHS chassis.

2. The system of claim 1, further comprising:
at least one fan chassis handle located on the fan chassis.

3. The system of claim 2, wherein the at least one fan chassis handle comprises at least one cam member and is moveably coupled to the fan chassis between an open position and a closed position, and wherein, when the fan chassis is located in the IHS chassis, movement of the at least one fan chassis handle from the open position to the closed position results in the at least one cam member engaging the IHS chassis and providing a camming mechanism that couples the fan chassis to the IHS chassis.

4. The system of claim 2, wherein the at least one fan chassis handle is moveably coupled to the fan chassis between an open position and a closed position, and wherein a fan is operable to be positioned in any of the plurality of fan housings with the at least one fan chassis handle in either of the open position and the closed position.

5. The system of claim 1, wherein the guide member is located on a first surface of the fan chassis, and wherein the IHS chassis cover anchor is located on a second surface of the fan chassis that faces an opposite direction as the first surface.

6. The system of claim 1, wherein the IHS chassis cover anchor comprises a latch and at least one guide pin aperture.

7. The system of claim 1, further comprising:
a plurality of feet extending from the fan chassis, wherein the plurality of feet extend adjacent a fan chassis surface of the fan chassis that the at least one board support member extends from and are operable to support the fan chassis on a support surface such that the fan chassis surface is substantially parallel to the support surface.

8. An information handling system (IHS), comprising:
an IHS chassis defining an IHS chassis housing and comprising a board located in the IHS chassis housing and a first guide member located adjacent a chassis wall;
a processor coupled to the board;
a fan chassis defining a plurality of fan housings and located in the IHS housing;
a second guide member located on the fan chassis;
at least one memory device located in the IHS chassis, coupled to the processor through the board, and engaging first guide member and the second guide member;
at least one board support member extending from the fan chassis, through the board, and into engagement with the IHS chassis; and
an IHS chassis cover anchor located on the fan chassis, wherein the IHS chassis cover anchor engages an IHS chassis cover and secures the IHS chassis cover to the IHS chassis.

9. The system of claim 8, further comprising:
at least one fan chassis handle located on the fan chassis.

10. The system of claim 9, wherein the at least one fan chassis handle comprises at least one cam member and is moveably coupled to the fan chassis between an open position and a closed position, and wherein the at least one cam member engages the IHS chassis and provides a camming mechanism that couples the fan chassis to the IHS chassis in response to movement of the at least one fan chassis handle from the open position to the closed position.

11. The system of claim 9, wherein the at least one fan chassis handle is moveably coupled to the fan chassis between an open position and a closed position, and wherein a fan is operable to be positioned in any of the plurality of fan housings with the at least one fan chassis handle in either of the open position and the closed position.

12. The system of claim 8, wherein the second guide member is located on a first surface of the fan chassis, and wherein the IHS chassis cover anchor is located on a second surface of the fan chassis that faces an opposite direction as the first surface.

13. The system of claim 8, wherein the IHS chassis cover anchor comprises a latch and at least one guide pin aperture.

14. The system of claim 8, further comprising:
a plurality of feet extending from the fan chassis, wherein the plurality of feet extend adjacent a fan chassis surface of the fan chassis that the at least one board support member extends from and are operable to support the fan chassis on a support surface such that the fan chassis surface is substantially parallel to the support surface.

15. The system of claim 8, further comprising:
at least one fan located in at least one of the plurality of fan housings.

16. The system of claim 8, wherein the fan chassis is operable to be removed from the IHS chassis housing while the at least one memory device remains located in the IHS chassis housing and coupled to the processor through the board, and wherein the memory device is operable to be removed from the IHS chassis housing while the fan chassis remains located in the IHS chassis housing and coupled to IHS chassis.

17. A method for mounting fans in an information handling system (IHS), comprising:
providing an IHS chassis defining an IHS chassis housing and comprising a board located in the IHS chassis housing and a first guide member located adjacent a chassis wall;
positioning a fan chassis in the IHS chassis housing such that at least one board support member extending from the fan chassis extends through the board and engages the IHS chassis;
engaging the first guide member that are located adjacent the chassis wall and a second guide member that are located on the fan chassis with at least one memory device; and
securing a IHS chassis cover to the IHS chassis by engaging the IHS chassis cover with an IHS chassis cover anchor located on the fan chassis.

18. The method of claim 17, further comprising: positioning at least one fan in the fan chassis.

19. The method of claim 17, further comprising;
coupling the fan chassis to the IHS chassis by moving at least one fan chassis handle that is on the fan chassis and that comprises at least one cam member from a open position to a closed position such that the at least one cam member engages the IHS chassis and provides a camming mechanism that couples the fan chassis to the IHS chassis.

20. The method of claim 17, further comprising:
removing the fan chassis from the IHS chassis housing such that the second guide member is disengaged from the at least one memory device while the first guide member remains engaged with the at least one memory device.

* * * * *